No. 782,319. PATENTED FEB. 14, 1905.
T. BRENNAN, Jr.
DISK DRILL.
APPLICATION FILED JULY 5, 1904.

2 SHEETS—SHEET 1.

Witnesses.
E. W. Jeppesen.
A. H. Opsahl.

Inventor.
Thomas Brennan Jr.
By his Attorneys.
Williamson & Merchant

No. 782,319. PATENTED FEB. 14, 1905.
T. BRENNAN, Jr.
DISK DRILL.
APPLICATION FILED JULY 5, 1904.

2 SHEETS—SHEET 2.

Witnesses.
E. W. Jeppesen.
A. H. Opsahl.

Inventor.
Thomas Brennan Jr.
By his Attorneys.
Williamson & Merchant

No. 782,319.                                    Patented February 14, 1905.

UNITED STATES PATENT OFFICE.

THOMAS BRENNAN, JR., OF ST. LOUIS PARK, MINNESOTA, ASSIGNOR TO THE MONITOR DRILL COMPANY, OF ST. LOUIS PARK, MINNESOTA, A CORPORATION OF MINNESOTA.

DISK DRILL.

SPECIFICATION forming part of Letters Patent No. 782,319, dated February 14, 1905.

Application filed July 5, 1904. Serial No. 215,210.

*To all whom it may concern:*

Be it known that I, THOMAS BRENNAN, Jr., a citizen of the United States, residing at St. Louis Park, in the county of Hennepin and State of Minnesota, have invented certain new and useful Improvements in Disk Drills; and I do hereby declare the following to be a full, clear, and exact description of the invention, such as will enable others skilled in the art to which it appertains to make and use the same.

My present invention relates to disk drills, and has for its object to improve the same in the several particulars hereinafter noted.

To the above ends the invention consists of the novel devices and combinations of devices hereinafter described, and defined in the claims.

The invention is illustrated in the accompanying drawings, wherein like characters indicate like parts throughout the several views.

Figure 1:
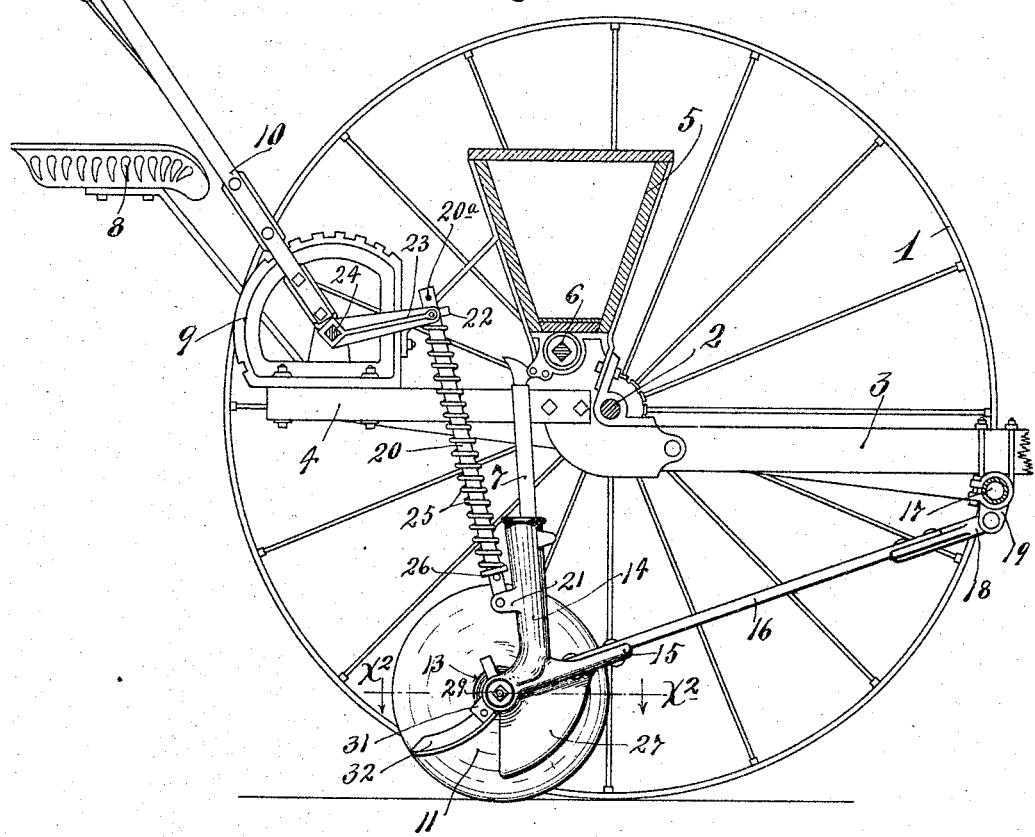
Figure 2:
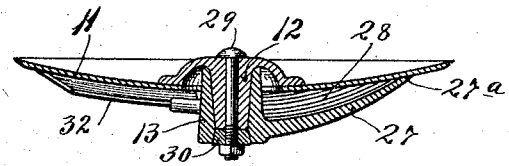
Figure 3:
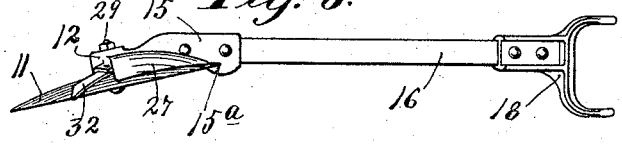
Figure 4:
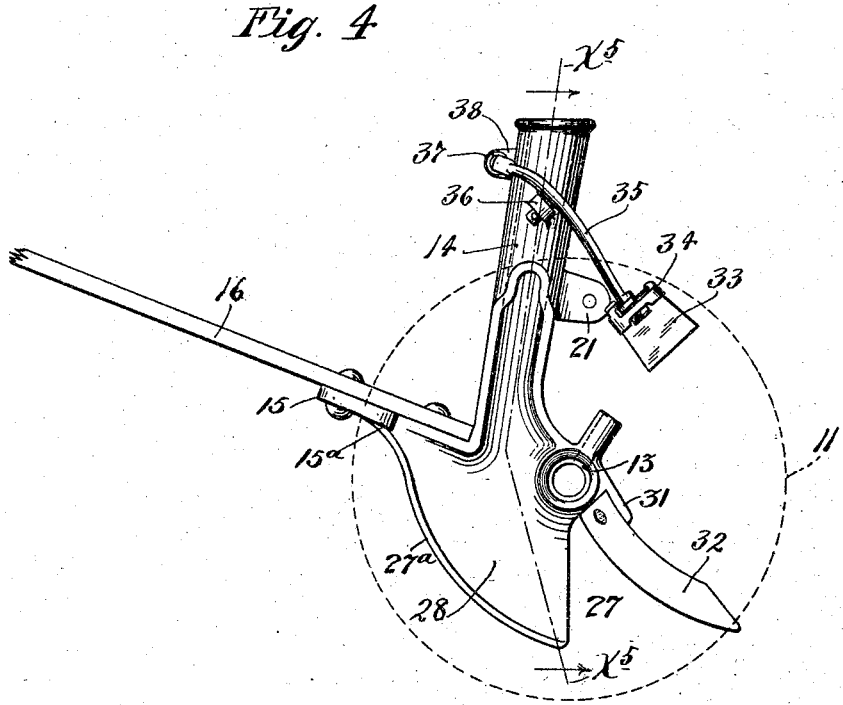
Figure 5:
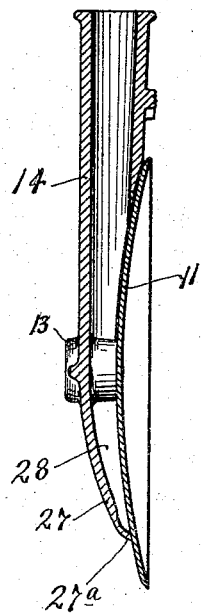

Figure 1 is a view in vertical section, taken from front to rear through a machine having applied thereto in accordance with my invention one of my improved disk-drill attachments. Fig. 2 is a horizontal section taken on the line $x^2\ x^2$ of Fig. 1. Fig. 3 is a detail in bottom plan view, showing one of my improved disk-drill attachments removed from the machine. Fig. 4 is a detail view looking at one of the disk-drill attachments from the opposite direction from which the same is viewed in Fig. 1; and Fig. 5 is a detail in vertical section, taken on the irregular line $x^5\ x^5$ of Fig. 4.

The numeral 1 indicates the wheel, the numeral 2 the axle, the numeral 3 the pole, the numeral 4 a rear frame extension, the numeral 5 the seed-hopper, the numeral 6 one of the feeding-cylinders, the numeral 7 one of the grain-delivery spouts, the numeral 8 the seat, the numeral 9 the latch-arch, and the numeral 10 the combined boot-lifting and pressure-regulating lever, of a seeding-machine, which, so far as described, is of the usual or any suitable construction.

The furrow-opening disk 11 (of which disks there are in a complete machine several arranged side by side, but independently mounted) is provided with a bearing-trunnion 12, which is journaled in the sleeve 13 of a seed-boot 14, which seed-boot has a forwardly-projecting stub-bar 15, which in turn is rigidly secured to the rear end of a drag-bar 16. The said drag-bar at its forward end is pivotally attached to a transverse frame portion 17, the same, as shown, being directly attached to a cast head 18, that is directly pivoted to a lug 19 on the said frame-section 17. Of course in the complete machine there is a drag-bar for each disk attachment. The head 15 has a deflecting-lug $15^a$, that overlaps the forward edge of the disk 11 and serves to steady the disk and to deflect laterally cornstalks and similar objects, and hence to prevent the same from crowding between the disk and said head 15.

The seed-spouts 7 are pivoted to the seed-hopper and extend into the seed-boots 14, as is usual. A lifting-rod 20 is pivotally attached at its lower end to a lug 21 on the rear portion of the boot 14 at a point vertically over the central axial portion of the bearing-sleeve 13 and trunnion 12. The upper end of said rod 20 works loosely through a block 22, pivoted to the forwardly-projecting end or arm portion 23 of the lever 10. In a complete machine there are of course one of these arms 23 for each disk attachment, and, as is usual, they are directly applied to a transverse rock-shaft 24, journaled in suitable bearings on the rear frame portion 4 and to which rock-shaft the lever 10 is also secured. A stop $20^a$ on the upper end of the rod 20 engages with the block 22 to cause the arm 23 to raise the boot and the disk when the lever 10 is thrown backward and downward. A suitable latch carried by the lever 10 coöperates with the notched arm 9 in the usual way to set the lever 10 and its arms 23 in different positions. A coiled spring 25 on the rod 20 is compressed between the block 22 and a collar 26 on the lower end of said rod and is adapted to yieldingly press the disk downward to its work. The lower portion of the boot 14 adjacent to the convex surface of the disk 11 is open and closely engages the said disk and the said boot forward of the axis of the disk is formed with a depending segmental guard-plate 27. This guard-plate 27 at its flanged peripheral portion 27ª closely engages the lower and forward convex portion of the disk; but the body thereof is spaced apart from the said disk, so as to leave a chamber 28 between the same and the said disk which chamber is open at its rear portion for the discharge of seeds.

By reference particularly to Figs. 1, 3, and 4 it will be noted that the rear portion of the guard-plate 27 terminates approximately on a vertical line intersecting the axis of the disk and that the cavity 28 opens on the same line. It is also important to note that the body of the seed-boot 14 extends approximately on a vertical line and is located in front of the axis of the disk, so that seeds dropped therethrough will fall into the cavity 28 on a line in front of the axis of the disk. (See particularly Fig. 4.)

By reference to Fig. 2 it will be noted that the bearing-trunnion 12 of the disk 11 tapers toward the convex side of the disk, and extends less than completely through the bearing-sleeve 13. A nutted bolt 29 is passed through the said trunnion 12 and through a short tapered bushing 30, the taper of which is reversed to that of the said trunnion 12. The outer portion of the sleeve 13 is reversely tapered to fit the bushing or section 30, and the said section 30 is firmly clamped to the trunnion 12, so that it becomes, in fact, a supplemental detachable section thereof. By this construction the trunnion is made reversely cone-shaped, so that the tendency of the trunnion to work laterally under rotation is neutralized and the said trunnion and its disk are held in working positions within the bearing-sleeve 13.

Rearward of the guard-flange 27 on the convex side of the disk 11 the bearing-sleeve 13 is provided with a lug 31, to which is rigidly attached a scraper-blade 32, that extends downward and rearward at an angle of approximately forty-five degrees to a perpendicular, with edge closely engaging the convex surface of said disk. This scraper 32 extends at such angle that any dirt which may be lodged between the outwardly-flaring upper portion thereof and the adjacent face of the disk will work its way downward and rearward, and hence away from the journal of the disk.

Working against the upper and outer concave surface of the disk 11 is a scraper-blade 33, held by a head 34, swiveled to the rear end of a lever 35, pivoted to a lug 36 on the inner upper portion of the boot 14, as best shown in Fig. 4. A short coiled spring 37 is compressed between the upper and forwardly-projecting end of the lever 35 and a lug 38 on the upper forward portion of the boot 14. This spring 37 acts to yieldingly press the scraper 33 against the disk. With the boot 14 extended in front of the axis of the disk a support for the scraper-lever 35 is provided at such point that the operating edge of the scraper 33 will stand substantially radial to the axis of the disk and will maintain engagement with the upper portion of the disk at a point but slightly to the rear of the axis.

By reference to Fig. 3 it will be noted that the outer surface of the guard-plate 27 extends slightly laterally outward beyond the adjacent edge of the disk, so that it will assist to some extent in opening up the furrow and will hold the furrow open long enough to insure the dropping of the seeds to the bottom of the furrow.

By reference to Figs. 4 and 5 it will be noted that the seeds dropped through the seed-boot will fall onto the inturned marginal flange 27ª of the guard-plate 27 considerably in advance of the axis of the disk and ahead of the open rear extremity of the cavity 28. At such point the inturned flange of the guard-plate has such rearward incline that the seeds dropped onto the same when the disk 11 is standing still will not be freely discharged from the cavity 28, but will be held between the disk and the said guard-plate. Hence when the machine is suddenly brought to a standstill such grain or seed as has been discharged from the feed device 6 and is falling through the spout 7 and boot 14 will not be deposited in a pile in the furrow, but will be held back by the said disk and guard-plate until rotary motion is given to the disk under the advance movement of the machine. When the machine is being drawn forward and the disk is rotated, said disk assisted by gravity will carry the seeds in an even stream or in the order in which they are dropped from the feed device out of the cavity 28 and deposit the same at the bottom of the furrow. With the journal of the disk located at the rear of the seed-conduit of the boot and of the seed-pocket formed by the depending guard-flange the seeds will be delivered against that portion of the disk which under the advance movement of the machine is moving downward. The disk therefore assists gravity in discharging the seeds from the pocket, and it is this fact that makes it possible to so form the pocket that it will retain or hold back the seeds when the disk is standing still.

By the above-described arrangement of the spring pressure device the force of the spring 20 is applied directly over the axis of the disk and at a point transversely of the disk approximately at the center of its journal. This, as is obvious, applies the force of the spring in a manner which will produce the most direct pressure and the least tendency to tip the disk to one side or the other.

What I claim, and desire to secure by Letters Patent of the United States, is as follows:

1. The combination with a seed-boot having a disk journaled thereto, at the rear of its vertical seed-conduit, said boot having a depending flange forming a pocket against one side of said disk, said pocket forming, in front of the disk-journal, a continuation of the seed-conduit and directing the seed against that portion of the disk which is moved downward under the advance movement of the machine, substantially as described.

2. The combination with a seed-boot having a disk journaled thereto at the rear of its vertical seed-conduit, said boot having a rigidly-secured drag-bar and a depending guard-plate extending forward of said journal, engaging said disk at its peripheral portion, but spaced apart therefrom inward of its margin or peripheral portion, and affording a seed-cavity receiving from said seed-boot, and open for the discharge of the seeds at a point below said journal, substantially as described.

3. In a machine of the character described, the combination with a seed-boot, a disk journaled thereto and a drag-bar connecting the same to the machine-frame, said boot having a seed-conduit extending in front of the disk-journal, and having a guard-plate forming a pocket against one side of said disk, extending below and in front of said journal and projecting laterally beyond the furrow-forming edge of the disk, of a yielding pressure device applied to said boot for forcing said disk to its work, substantially as described.

4. In a machine of the character described, a seed-boot and a disk journaled thereto, said boot having a seed-conduit extending forward of the disk-journal, and having a guard-plate extending below and forward of said disk-journal, said guard-plate and disk, when the latter is standing still, coöperating to hold back the seeds, and said disk operating, when rotated under the advance movement of the machine, to discharge the seeds into the furrow, substantially as described.

5. In a machine of the character described, a seed-boot, a drag-bar connecting the same to the machine-frame, and a disk journaled to said boot, said boot having a deflecting lug or projection embracing and closely engaging the edge and forward portion of the disk, substantially as described.

In testimony whereof I affix my signature in presence of two witnesses.

THOMAS BRENNAN, Jr.

Witnesses:
R. C. MABEY,
F. D. MERCHANT.